May 16, 1939. M. WAGNER Re. 21,091

POWER DRIVEN VEHICLE

Original Filed Jan. 26, 1934 3 Sheets-Sheet 1

INVENTOR
MAX WAGNER
BY A. A. Hirke
ATTORNEY

May 16, 1939. M. WAGNER Re. 21,091

POWER DRIVEN VEHICLE

Original Filed Jan. 26, 1934 3 Sheets-Sheet 2

INVENTOR
MAX WAGNER
BY A. A. Clike
ATTORNEY

May 16, 1939. M. WAGNER Re. 21,091
POWER DRIVEN VEHICLE
Original Filed Jan. 26, 1934 3 Sheets-Sheet 3
Fig. 10.
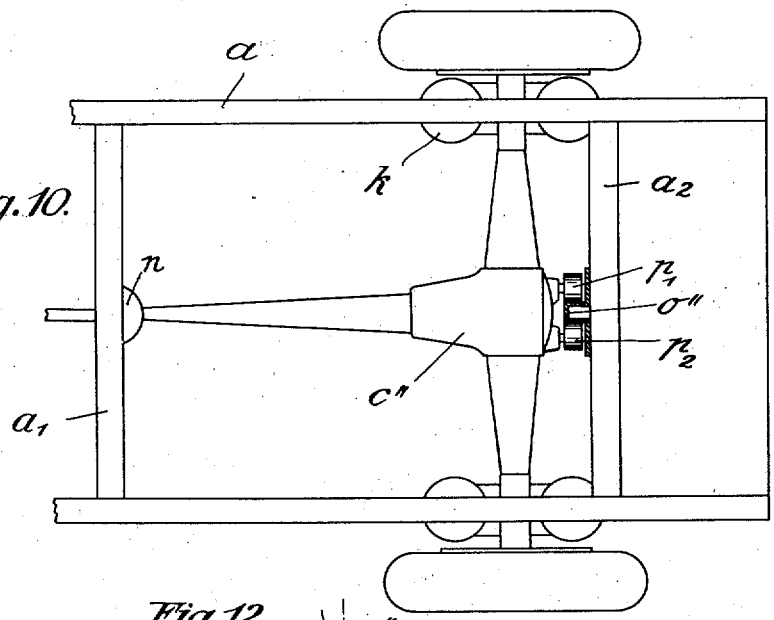
Fig. 12.
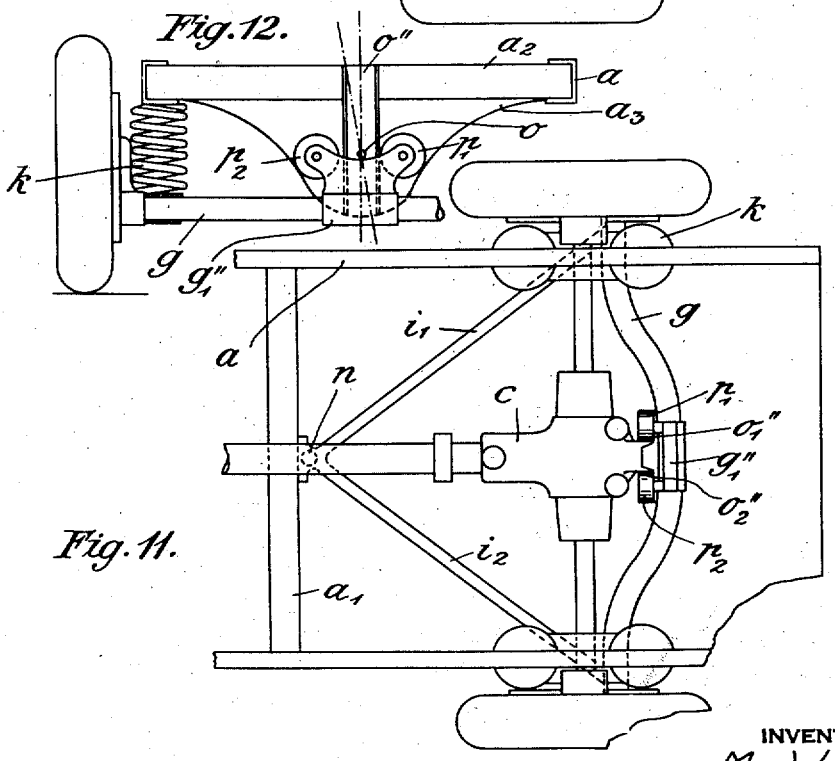
Fig. 11.
INVENTOR
MAX WAGNER
BY A. Ahlich
ATTORNEY Reissued May 16, 1939

Re. 21,091

UNITED STATES PATENT OFFICE 21,091

POWER DRIVEN VEHICLE

Max Wagner, Stuttgart, Germany, assignor to Daimler Benz Aktiengesellschaft, Stuttgart-Unterturkheim, Germany Original No. 2,074,289, dated March 16, 1937, Serial No. 708,486, January 26, 1934. Application for reissue March 16, 1939, Serial No. 262,202. In Germany February 3, 1933

20 Claims. (Cl. 280—112)

Figure 1:
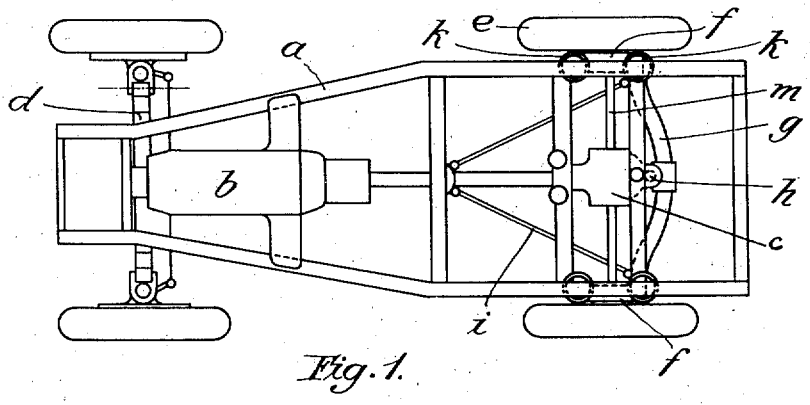

This invention relates to an axle arrangement for vehicles and has for its object to enable the driving forces in the case of rigid axles to be suitably taken up, for which purpose the axle is pivotally connected either directly or indirectly to the frame in such a manner that it can swing about a longitudinal axis in the longitudinal central plane of the vehicle passing through the point of connection of the axle with the frame. At the same time the axle is preferably guided in a vertical or nearly vertical track which takes up the forces acting between the axle and the frame in a direction transverse to the longitudinal axis of the vehicle.

With this arrangement for guiding and supporting the axle it is, for example, also possible to use simple unguided helical springs for springing rigid axles.

Preferably also the driving forces acting in the longitudinal direction of the vehicle are transmitted to the frame by triangularly arranged struts. The differential gearing in particular is secured to the frame so that it does not take part in the movement of the axle.

A specially favorable arrangement is obtained when a rear axle constructed in this manner is combined with independently sprung front wheels which are guided parallel to one another, for example, by means of two transverse springs.

Such a springing arrangement for the front wheels has the advantage that the wheels are free from gyroscopic reactions which are one of the principal causes of shimmy although there is the disadvantage that the axis of the transverse oscillations at the front wheels lies at the height of the ground so that there is a long lever arm for the forces acting at the centre of gravity of the vehicle and consequently the vehicle is inclined to sway. In order to diminish this tendency it has already been proposed to guide the independently sprung rear wheels by swinging half axles, whereby the axis of the transverse oscillations at the rear wheels is raised to about the height of the springing and consequently a swinging axis rising from the front towards the rear is obtained.

This method of springing the rear wheels which in itself is satisfactory is, however, not always advantageous for all kinds of vehicles. The invention therefore provides for the rear axle the arrangement referred to above and more fully described below in which the axis of the transverse oscillations at the rear wheels passes through the point where the rear axle is pivoted to the frame. In this case the rear axle corresponds to the usual constructions in so far as the wheels are connected together by a common axle but it also has the advantages of the independent springing in as much as the differential casing is secured to the frame and consequently the masses which are not sprung are reduced to a minimum.

The invention further relates to particularly advantageous constructions of the guiding of the axle on the frame. Preferably the guiding or supporting point of the axle on the frame or on a part connected therewith is placed as high as possible so that a correspondingly high position of the axis of transverse oscillations is obtained.

In a preferred constructional form, the guiding members on the guiding track, for example rubber rollers, are made elastic or the guiding track itself is made elastic.

In this way the lateral forces acting between the frame and the axle, which cannot be taken up by helical springs, in contradistinction to leaf springs, are provided for in a very advantageous manner by the shocks impinging on the wheels in a transverse direction being taken up resiliently instead of being transmitted to the frame. Further, with a suitable construction of the guiding, the elastic members may allow a tilting of the vehicle relative to the axle, while being constrained to guide the vehicle body back into the vertical position. For example, the arrangement may be such that as the oblique position of the vehicle body increases not only the forces but also the arm of the returning moment becomes greater.

In the accompanying drawings constructional examples of the invention are illustrated.

Figure 2:
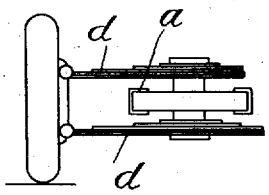
Figure 3:
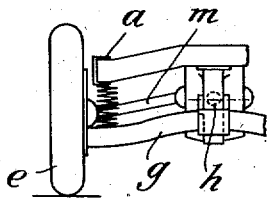
Figure 4:
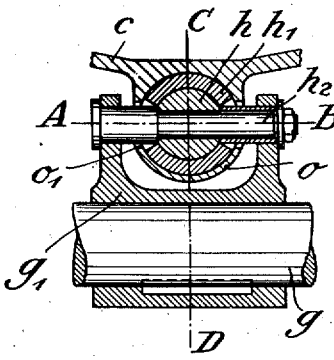
Figure 5:
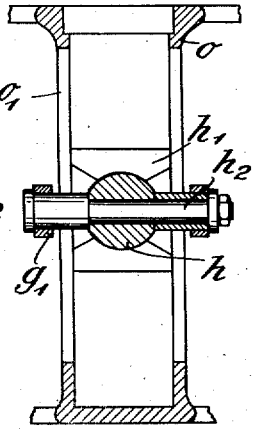
Figure 6:
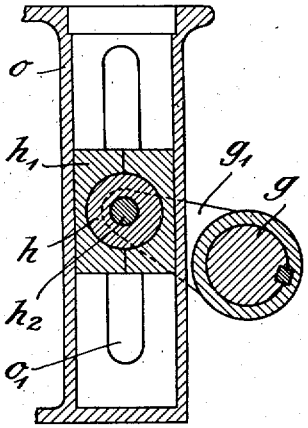
Figure 7:
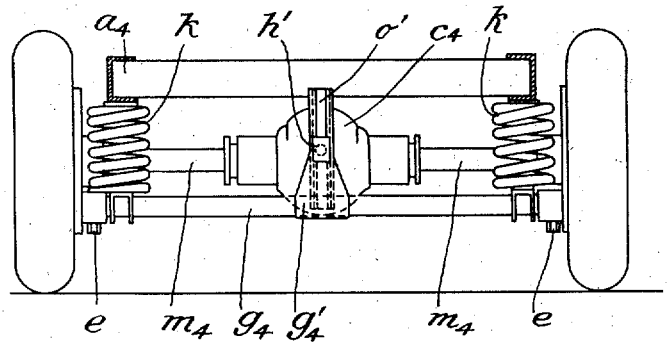
Figure 8:
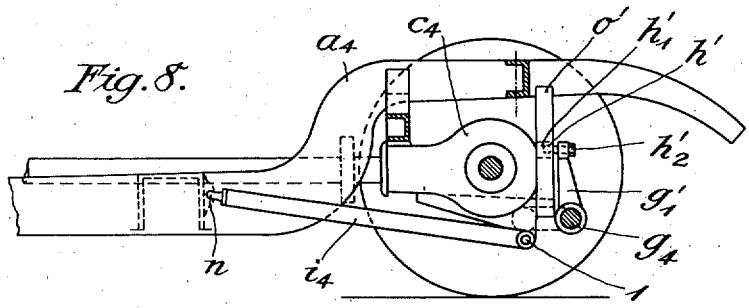
Figure 9:
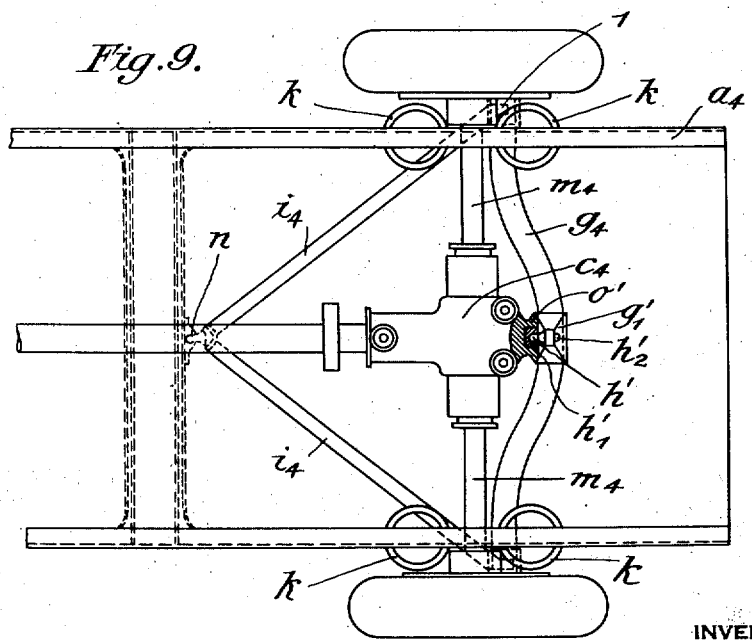

Fig. 1 shows a plan arrangement of a vehicle with parallel guiding of the front wheels and a rear axle arrangement according to the invention, Fig. 2 shows an elevation of the front wheel springing of this vehicle, Fig. 3 an elevation of the rear axle, Fig. 4 a horizontal section through the pivoting and guiding arrangements of the rear axle on the frame on an enlarged scale, Fig. 5 a vertical section on the line A—B of Fig. 4, Fig. 6 a vertical longitudinal section on the line C—D of Fig. 4, Fig. 7 another constructional form of the rear axle in elevation from behind, Fig. 8 a longitudinal elevation and Fig. 9 a plan of this rear axle, Fig. 10 shows a further construction of the rear axle in which the rear axle encloses the rear axle gearing in the usual manner, Fig. 11 shows a similar construction of the rear axle in which the rear axle gearing is arranged on the frame and Fig. 12 is a rear elevation of a rear axle in a similar construction to Fig. 11.

In the constructional example according to Figs. 1–6, $a$ is the frame on which the motor $b$ is suspended and the differential casing $c$ is suspended, for example at three points, preferably resiliently by means of rubber springs or the like. The front wheels are guided parallel or substantially parallel to one another by means of transverse springs $d$ or the like so that the wheels are free from gyroscopic reactions which affect the steering. The rear wheels $e$ are mounted on stub axles $f$ which are connected together by a connecting member or a swinging axle $g$. The latter is pivotally connected by means of a ball joint $h$ to the differential casing either directly or indirectly, for example, by means of resilient arrangements somewhat in the manner described in the following and is supported with respect to the frame by means of struts $i$. The axle carriers or stub axles are supported with respect to the frame by helical springs $k$ which are preferably frictionless and unguided. The wheels are driven through Cardan shafts $m$. The swinging axis for the transverse oscillations runs in such a manner that it intersects the ground in the plane of the front wheels, while at the rear wheels it passes through the joint $h$ at about the height of the springing. The differential casing does not take part in the swinging of the rear wheels about the joint $h$.

In Figs. 4–6 the connecting and guiding means for the rear axle in a constructional example are more fully described.

The casing $c$ of the differential gear is in this case provided with a vertical hollow cylinder $o$ which may be integral with the casing or may be secured thereto. In this a sliding member $h_1$ made, for example, in two parts is mounted so as to be displaceable in a vertical direction, this member being made cylindrical on the outside and having a spherical opening on the inside which receives the ball $h$. This ball has a passage bored through it. A pin $h_2$ is placed through the passage and passes through the slots $o_1$ of the cylinder $o$ and is mounted in the arms of a forked sleeve $g_1$ keyed rigidly to the axle $g$.

The arrangement is such that the axle $g$ can move freely up and down and at the same time can rotate about the axis C—D, in Fig. 4, the ball $h$ and the sliding member $h_1$ serving for guiding and also for laterally supporting the axle.

A further constructional form is illustrated in Figs. 7–9.

Here also, $a_4$ is the frame to which is secured the differential casing $c_4$ either resiliently or rigidly, for example, by means of rubber buffers. The wheels are connected together by a tubular axle $g_4$ which is bent out rearwardly. In the central longitudinal plane of the vehicle this axle carries an arm $g_1'$ to which is secured a bolt $h_2'$ with the ball h'. The latter is mounted in a sliding member $h_1'$ which is guided in a vertical direction in the sliding path $o'$ arranged on the differential casing. Near to the wheels the two struts $i_4$, which are rigidly connected together, are pivotally attached to the axle by joints $l$, the struts being able to swing on the frame about a ball joint $n$.

The wheels are sprung by means of the helical springs $k$ which are unguided over their length and at their ends are rigidly connected with the frame or the axle. The drive is effected from the differential gear by means of Cardan shafts $m_4$.

When both wheels yield simultaneously, the axle is raised, being guided by the ball joint $h'$ in the sliding path $o'$ and also by the struts in the joints $l$. A yielding of only one wheel has the result that the axle becomes inclined to the frame, being correspondingly displaced in the guide $o'$ and at the same time together with the struts swinging about the longitudinal axis fixed by the joints $h'$ and $n$.

With purely transverse oscillations or when travelling around curves the joint $h'$ forms the centre of oscillations so that the distance from the point at which the centrifugal force acts becomes smaller the higher the joint is arranged. The axle arrangement therefore gives a still greater stability of the vehicle in transverse oscillations than is the case with the ordinary rigid axles, and all the more so as the lateral forces are taken up not by the yielding springs but by the guiding arrangement which is rigid or substantially rigid in the transverse direction. The helical springs are therefore relieved from all transverse and lateral forces.

The arrangements may of course also be used for non-driven or steering axles and also for leaf springs. Further, the guiding may be provided in another manner, for example, by means of a cylinder and piston or the like. The guiding arrangement is preferably suitably enclosed to prevent access of dirt and to ensure proper lubrication.

In Fig. 10 the rear axle bridge $c''$ is connected with the frame $a$ by the driving ball $n$ mounted on the transverse member $a'$ For the springing helical springs $k$ are used. For taking up the lateral forces there is provided a guiding track $o''$ secured to the rear transverse member $a_2$, for example, in the form of a U-bar which is arranged vertically or in a circle with the ball $n$ as the center. The rear axle $c''$ is supported against this guiding track by means of rubber rollers $p_1$ and $p_2$ which, preferably with a certain initial tension, roll along opposite sides of the guiding track $o''$.

In Fig. 11 a construction is illustrated in which the differential gearing $c$ is secured to the frame (in a manner not fully illustrated), preferably resiliently in three points. The axle $g$ with the struts $i_1$ and $i_2$ form a triangular framework which may be rigid and which can swing about the front joint $n$. The guiding tracks $o_1''$ and $o_2''$ are, for example, arranged directly on the differential casing, while the rollers $p_1$ and $p_2$ are mounted on the axle $g$ through a sleeve member $g_1''$ (in a manner similar to that shown in Fig. 12).

The constructional form according to Fig. 12 corresponds somewhat to that shown in Fig. 11, but here the guiding rail $o''$, similarly to that in Fig. 10, is secured to a transverse member $a_2$ and reinforced by a metal sheet $a_3$.

The rollers are preferably mounted on their pivot pins by means of needle bearings, rubber rings as large as possible being placed on the needles by means of a steel hub. The rollers or the corresponding guide members are preferably arranged at such a distance apart on the sleeve $g_1''$ or the like that they can only be pushed over the rail $o''$ with an initial tension so that an increased lateral stability is ensured. In Fig. 12 the guiding rollers are arranged about at the height of the wheel centres. In order to increase the stability of the vehicle against transverse oscillations, however, the guiding rollers may be arranged still higher. The axis about which the vehicle body turns in transverse inclinations lies approximately at O in the middle between the rollers $p_1$ and $p_2$. On account of the elasticity of the rollers these will yield when the vehicle body is inclined laterally but at the same time will tend to restore its position, not only the restoring force due to the compression of the rubber, but also the arm of the restoring moment being increased as the obliquity of the axle increases. A high position of the rollers or of the centre of oscillation O in the plane of the rear wheels is of advantage especially when the front wheels are guided parallel independently of one another in order to avoid gyroscopic effects so that the axis of the transverse oscillations in the plane of the front wheels runs through a point near to the ground.

The guiding rollers or the corresponding guiding elements may of course be mounted on the frame or the like instead of on the axle, while the guiding tracks in this case would be arranged on the axle. Further, the rollers could be made rigid and the guiding tracks resilient, for example, using rubber on steel supports. Instead of a common guiding rail *o''*, it is possible to provide for each roller a separate guiding track arranged inside or outside the roller, the arrangement inside the roller has, however, the advantage of a greater stability of the vehicle against lateral oscillations, as with the guiding tracks arranged outside the rollers, there is a tendency to remove the load from the rollers when the vehicle body becomes inclined. This, however, could be opposed, for example, by using in each case two or more rollers arranged one above another. Such an arrangement of several resilient guiding members can of course also be used in the other cases.

What I claim is:

1. In a vehicle, a frame, a pair of supporting wheels, an axle connecting said wheels, means mounted on the vehicle frame and on the axle for guiding the axle relative to the frame in a substantially vertical longitudinal central plane of the vehicle, said means comprising a substantially vertical guiding track, and guiding means coacting with this guiding track and containing resilient intermediate members in such a manner that on account of the resilience of the intermediate members at the same time a swinging movement of the axle about a longitudinal axis of the vehicle is made possible.

2. In a vehicle, a frame, a pair of supporting wheels, an axle connecting said wheels, a guiding track running substantially vertically and connected with the frame, rollers mounted on the axle and guided on the guiding track for guiding the axle on the guiding track in a vertical direction, which rollers co-operate yieldingly with the guiding track in such a manner that they allow at the same time a swinging movement of the axle about a longitudinal axis substantially passing through the points of contact of the rollers with the guiding track.

3. In a power-driven vehicle, the combination claimed in claim 1 in which the yielding intermediate members are initially tensioned so that the guiding means bear against the guiding track under pressure.

4. In a power-driven vehicle, the combination claimed in claim 2 together with unguided helical springs by which the axle is sprung with respect to the frame and strut members which are connected with the axle and are pivoted to the frame in such a manner that they can take up the forces acting in the longitudinal direction between the axle and the frame.

5. In a vehicle, a frame, a pair of supporting wheels, an axle connecting said wheels, a guiding rail connected with the frame arranged in a substantially vertical direction in the longitudinal central plane of the vehicle, at least two rollers mounted on the axle on either side of the guiding rail which rest against the guiding rail from the opposite sides and roll on it in a vertical direction for guiding the axle, the said rollers co-operating yieldingly with the guiding track in such a manner that they allow at the same time a swinging movement of the axle about a longitudinal axis substantially passing through the points of contact with the rails of the guiding track.

6. In a vehicle, a frame, a pair of supporting wheels, an axle connecting said wheels, guiding means connected to the frame and to the axle for supporting the axle against displacement relatively to the frame for preventing swinging of the axle relatively to the frame transversely to the direction of travel, said guiding means comprising solely a substantially vertical guiding track having two external lateral guiding surfaces and a single pair of rollers of rubber rotatable about axes extending in the direction of travel of the vehicle and bearing against said external guiding surfaces.

7. In a vehicle, a frame, a pair of supporting wheels, an axle connecting said wheels, a double-sided guiding track arranged substantially vertically on the frame in the longitudinal central plane of the vehicle, two guide rollers mounted on the axle on opposite sides of the central longitudinal plane of the vehicle so as to embrace the guiding track between them and to roll upon the respective sides of the guiding track so as to guide the axle in the vertical direction relatively to the frame, said guide rollers consisting of rubber so as to be capable of yielding elastically to permit of swinging motion of the frame relatively to the axle about a longitudinal axis passing substantially through a central point between the two rollers.

8. In a vehicle, a frame, a pair of supporting wheels, an axle connecting said wheels, thrust transmitting means connected at one end to the axle and pivotally connected at the other end to the frame, so as to be capable of swinging together with the axle in all directions with respect to the frame, and supporting means on the vehicle frame and on the axle respectively for supporting the axle against displacement relatively to the frame transversely to the direction of travel of the vehicle, said supporting means comprising a substantially vertical guiding track arranged substantially in the central longitudinal plane of the vehicle and guiding means coacting with said guiding track and having bearing support means therefor on the axle, said guiding means being displaceable on said bearing support means so as to allow the axle to swing in a plane transversely to the direction of travel of the vehicle.

9. In a vehicle, a frame, a pair of supporting wheels, an axle connecting the wheels, thrust transmitting means connected to the axle and pivotally connected to the frame, so as to be capable of swinging with the axle in a vertical longitudinal plane of the vehicle, and supporting means on the vehicle frame and on the axle respectively for supporting the axle against displacement relatively to the frame transversely to the direction of travel of the vehicle, said supporting means comprising a substantially vertical guiding track and guiding members coacting with said guiding track, said guiding members having bearing support means located so that the guiding members engage the vertical guiding track above the centre line of the wheels and being yieldingly applied to said bearing support means so as to allow the axle to swing about a longitudinal axis around a swinging centre above the centre line of the wheels in a plane transversely to the direction of travel of the vehicle.

10. In a vehicle, a frame, a pair of supporting wheels, an axle connecting the wheels, thrust transmitting means connected to the axle and pivotally connected to the frame, so as to be capable of swinging with the axle in a vertical longitudinal plane of the vehicle, and supporting means on the vehicle frame and on the axle respectively for supporting the axle against displacement relatively to the frame transversely to the direction of travel of the vehicle, said supporting means comprising a substantially vertical guiding track connected to the frame and having two lateral guiding surfaces thereon extending vertically and in the direction of travel and guiding members coacting with said guiding track, said guiding members having bearing support means therefor on the axle and located above the centre line of the wheels so that the guiding members engage the lateral guiding surfaces of the vertical guiding track above said centre line from opposite sides, said guiding members being yieldingly applied to said bearing support means so as to permit a vertical translational movement of the axle and a swinging movement of the axle relatively to the frame around a longitudinal axis and about a swinging centre above the centre line of the wheels.

11. In a vehicle, a frame, a pair of supporting wheels, an axle connecting the wheels, thrust transmitting means connected to the axle and pivotally connected to the frame, so as to be capable of swinging with the axle in a vertical longitudinal plane of the vehicle, and supporting means on the vehicle frame and on the axle respectively for supporting the axle against displacement relatively to the frame transversely to the direction of travel of the vehicle, said supporting means comprising a substantially vertical guiding track having two lateral guiding surfaces thereon extending vertically and in the direction of travel and a single pair of guide rollers arranged one on each side of the vertical guiding track in substantially the same transverse plane of the vehicle and bearing support means for the guide rollers, said guide rollers rotatable on said bearing support means around axes extending in the direction of travel of the vehicle and being yieldingly applied to the bearing support means so as to allow the axle to execute a rolling vertical movement relatively to the frame.

12. In a vehicle, a frame, a pair of supporting wheels, an axle connecting said wheels, a universal pivot on the frame, thrust rods connected to said universal pivot and to the axle so as to form therewith a substantially horizontal triangle, springing means between the axle and the frame, said springing means being incapable of resisting horizontal forces acting between the axle and the frame, and supporting means on the vehicle frame and on the axle respectively for supporting the axle against displacement relatively to the frame transversely to the direction of travel of the vehicle, said supporting means comprising a substantially vertical guiding track having two lateral guiding surfaces thereon extending vertically and in the direction of travel and a single pair of guide rollers arranged one on each side of the vertical guiding track in substantially the same transverse plane of the vehicle so that each roller co-operates with a single guiding track and bearing support means for the guide rollers, said guide rollers rotatable on said bearing support means around axes extending in the direction of travel of the vehicle and being yieldingly applied to the bearing support means so as to allow the axle to execute a rolling vertical movement relatively to the frame.

13. In a vehicle, the combination of a frame, a pair of front supporting wheels and guiding means connected to said front wheels and to the frame for guiding the front wheels so as to be movable upwardly and downwardly in plane substantially parallel to one another, so as to enable the vehicle frame to swing about a longitudinal axis with the front swinging centre located on the ground, a pair of rear supporting wheels, an axle connecting the wheels, thrust transmitting means connected to the axle and pivotally connected to the frame, so as to be capable of swinging with the axle in a vertical longitudinal plane of the vehicle, and supporting means on the vehicle frame and on the axle respectively for supporting the axle against displacement relatively to the frame transversely to the direction of travel of the vehicle, said supporting means comprising a substantially vertical guiding track and guiding members coacting with said guiding track, said guiding members having bearing support means located so that the guiding members engage the vertical guiding track above the centre line of the wheels and being yieldingly applied to said bearing support means so as to allow the axle to swing about a longitudinal axis around a swinging centre above the centre line of the wheels in a plane transversely to the direction of travel of the vehicle and define a rear swinging centre for the vehicle frame above the centre line of the rear wheels, whereby the axis of the lateral swinging movements of the frame ascends from the ground at the front end to a point above the centre line of the rear wheels at the rear end.

14. In a vehicle, a frame, a pair of supporting wheels, an axle connecting said wheels, a substantially vertical guiding track connected to the frame and having two lateral guiding surfaces extending vertically and in the direction of travel, guide members arranged on the axle above the centre line of the said wheels and applied yieldingly against said guiding surfaces from opposite sides, so as to permit of a vertical translational movement of the axle and of a relative swinging movement between the axle and the frame around a longitudinal axis above said centre line of the wheels, thrust rods connected to the axle and to one another so as to form a substantially horizontal triangle, a universal pivot on the frame for connecting the apex of the triangle to the frame, springing means between the axle and the frame, said springing means being incapable of resisting horizontal forces acting between the axle and the frame, so that all the said horizontal forces are taken up solely by the universal pivot and the guiding track and rollers.

15. In a vehicle comprising a frame having a pair of front supporting wheels and guiding means for the front wheels for guiding the front wheels parallel to themselves, a pair of rear supporting wheels, an axle connecting said wheels, supporting means connected to the vehicle frame and to the axle for supporting the axle against displacement relatively to the frame transversely to the direction of travel of the vehicle, said supporting means comprising a substantially vertical guiding track and guiding members applied yieldingly to said guiding track above the centre line of the said wheels so as to guide the axle vertically relatively to the frame and permit of relative swinging movement between the axle and the frame around a longitudinal axis above said centre line of the wheels and define a longitudinal axis of swing for the swinging movements of the frame rising from the ground at the front end in an upwardly inclined direction rearwardly to above the center line of the rear wheels.

16. In a vehicle, a frame, a pair of front supporting wheels, guiding means connected to said front wheels and to the frame for guiding the front wheels so as to be movable upwardly and downwardly substantially parallel, so as to enable the vehicle frame to swing about a longitudinal axis with a front swinging centre located in the nearness of the ground, a pair of rear supporting wheels, an axle connecting the wheels, springing means for springing the axle relatively to the frame and supporting means between the axle and the frame for supporting the axle against the frame transversely to the direction of travel of the vehicle so as to allow the axle to swing about a longitudinal axis with an elevated rear swinging centre, whereby the axis of the lateral swinging movements of the frame ascends as a whole from the nearness of the ground at the front end to an elevated point at the rear end of the vehicle.

17. In a power-driven vehicle, the combination claimed in claim 16, together with a rear axle gear casing arranged independently from the axle on the frame and driving means between the rear axle gear casing and the rear wheels for driving the latter.

18. In a vehicle, the combination claimed in claim 16, wherein the springing means for springing the rear axle relatively to the frame are constructed as springing elements which are capable of taking up vertical forces acting between the axle and the frame, but incapable of resisting horizontal forces acting between the axle and the frame.

19. In a vehicle, the combination claimed in claim 16, wherein the springing means for springing the rear axle relatively to the frame are constructed as substantially unguided helical springs.

20. In a vehicle, the combination claimed in claim 16, together with thrust members connected to the rear axle and pivoted to the frame in such a member that they can take up the forces acting in the longitudinal direction between the axle and the frame.

MAX WAGNER.